United States Patent [19]

Goodrich, Jr. et al.

[11] Patent Number: 5,070,958
[45] Date of Patent: Dec. 10, 1991

[54] VARIABLE EFFORT STEERING GEAR

[75] Inventors: Stanley R. Goodrich, Jr., Reese; Ronald L. Harkrader, Bay City, both of Mich.

[73] Assignee: General Motors Corporation, Detroit, Mich.

[21] Appl. No.: 669,810

[22] Filed: Mar. 15, 1991

[51] Int. Cl.⁵ .............................................. B62D 5/06
[52] U.S. Cl. ................................... 180/143; 180/147; 74/388 PS
[58] Field of Search ............... 180/132, 142, 143, 147, 180/148; 74/388 PS; 137/625.68; 91/374

[56] References Cited

U.S. PATENT DOCUMENTS

| 2,939,429 | 6/1960 | Charlson | 137/596 |
| 3,787,136 | 1/1974 | Steiner | 408/139 |
| 3,930,554 | 1/1976 | Ward | 180/147 |
| 3,991,656 | 11/1976 | Miyata et al. | 180/147 X |
| 4,034,825 | 7/1977 | Adams | 180/143 |
| 4,381,698 | 5/1983 | Hasegawa et al. | 91/382 |
| 4,381,799 | 5/1983 | Sato et al. | 137/625.68 |
| 4,454,801 | 6/1984 | Spann | 91/375 A |
| 4,465,101 | 8/1984 | Hasegawa | 137/625.68 |
| 4,593,783 | 6/1986 | Honaga et al. | 180/143 X |
| 4,759,420 | 7/1988 | Schipper, Jr. et al. | 74/388 PS X |
| 4,765,427 | 8/1988 | Yonker | 180/143 |
| 4,768,604 | 9/1988 | Schipper | 180/143 |
| 4,774,847 | 10/1988 | Breitweg | 74/388 PS |
| 4,793,433 | 12/1988 | Emori et al. | 180/143 |
| 4,819,545 | 4/1989 | Dymond | 91/371 |

FOREIGN PATENT DOCUMENTS 61-48872 4/1986 Japan .
61-155065 7/1986 Japan .
2044697A 10/1980 United Kingdom .

OTHER PUBLICATIONS

GB2199-000-A Abstract—TRW Cam Gears Ltd. 19.12.86-GB-030373.

Primary Examiner—Kenneth R. Rice
Assistant Examiner—Kevin Hurley
Attorney, Agent, or Firm—Saul Schwartz

[57] ABSTRACT

A variable effort power steering gear including detent elements in radial sockets in a pinion head, detent grooves in a stem of a stub shaft, an annular low speed reaction piston on the pinion head engageable on the detent elements when the low speed piston moves in a first direction, and an annular high speed reaction piston on the pinion head engageable on the detent elements when the high speed piston moves in a second direction opposite the first direction. Low and high speed bias springs apply first and second bias forces against the low and high speed reaction pistons. A control effects a fluid pressure gradient across the high speed piston in a low speed range of the steering gear counter to the second bias force so that in the low speed range only the first bias force is operative to urge the detent elements into the detent grooves and in the high speed range both the first and the second bias forces are operative to urge the detent elements into the detent grooves.

4 Claims, 2 Drawing Sheets

VARIABLE EFFORT STEERING GEAR

FIELD OF THE INVENTION

This invention relates to variable effort hydraulic power steering gears for automobiles.

BACKGROUND OF THE INVENTION

Typical hydraulic power steering gears for automobiles have relatively rotatable valve elements connected to input and output members of the steering gear and a torsion bar which resists relative rotation between the input and output members. U.S. Pat. No. 2939429, issued 7 June 1960 to L. L. Charlson, describes a non-torsion bar steering gear, i.e. a rotary valve steering gear without a torsion bar between input and output members of the steering gear, in which detent elements on a valve spool are spring biased into detent grooves in a valve sleeve and resist relative rotation between the valve sleeve and the valve spool. In addition, steering assist boost pressure is ported behind the detent elements to increase resistance to relative rotation between the valve spool and valve sleeve as boost pressure increases. An automotive power steering gear according to this invention is a non-torsion bar steering gear featuring improved detent reaction means and control therefor.

SUMMARY OF THE INVENTION

This invention is a new and improved variable effort, non-torsion bar automotive power steering gear including detent elements in radial sockets in a pinion head or output member of the steering gear and detent grooves in a stub shaft or input member of the steering gear, the detent elements resisting relative rotation between the input and output members in proportion to the magnitude of radial detent forces on the detent elements urging them into respective ones of the detent grooves. A low speed reaction piston with a beveled end face is mounted on the steering gear around the pinion head on one side of the radial sockets for longitudinal movement such that its beveled end face imparts radial detent forces on the detent elements when the low speed piston is urged in a first direction. A high speed reaction piston with a beveled end face is mounted on the steering gear around the pinion head on the other side of the radial sockets for longitudinal movement such that its beveled end face imparts additional radial detent forces on the detent elements when the high speed reaction piston is urged in a second direction opposite the first direction. A low speed bias spring urges the low speed piston in the first direction and a high speed bias spring urges the high speed piston in the second direction. In a low speed operating range of the steering gear, a net fluid pressure force is a applied against the high speed piston counter to the high speed bias spring to minimize resistance to relative rotation between the input and output members. In a high speed operating range of the steering gear, the net fluid pressure force on the high speed reaction piston is removed so that the beveled end face of the high speed reaction piston is urged by the high speed bias spring against the detent elements to increase the resistance to relative rotation between the input and output members.

DESCRIPTION OF A PREFERRED EMBODIMENT

Figure 1:
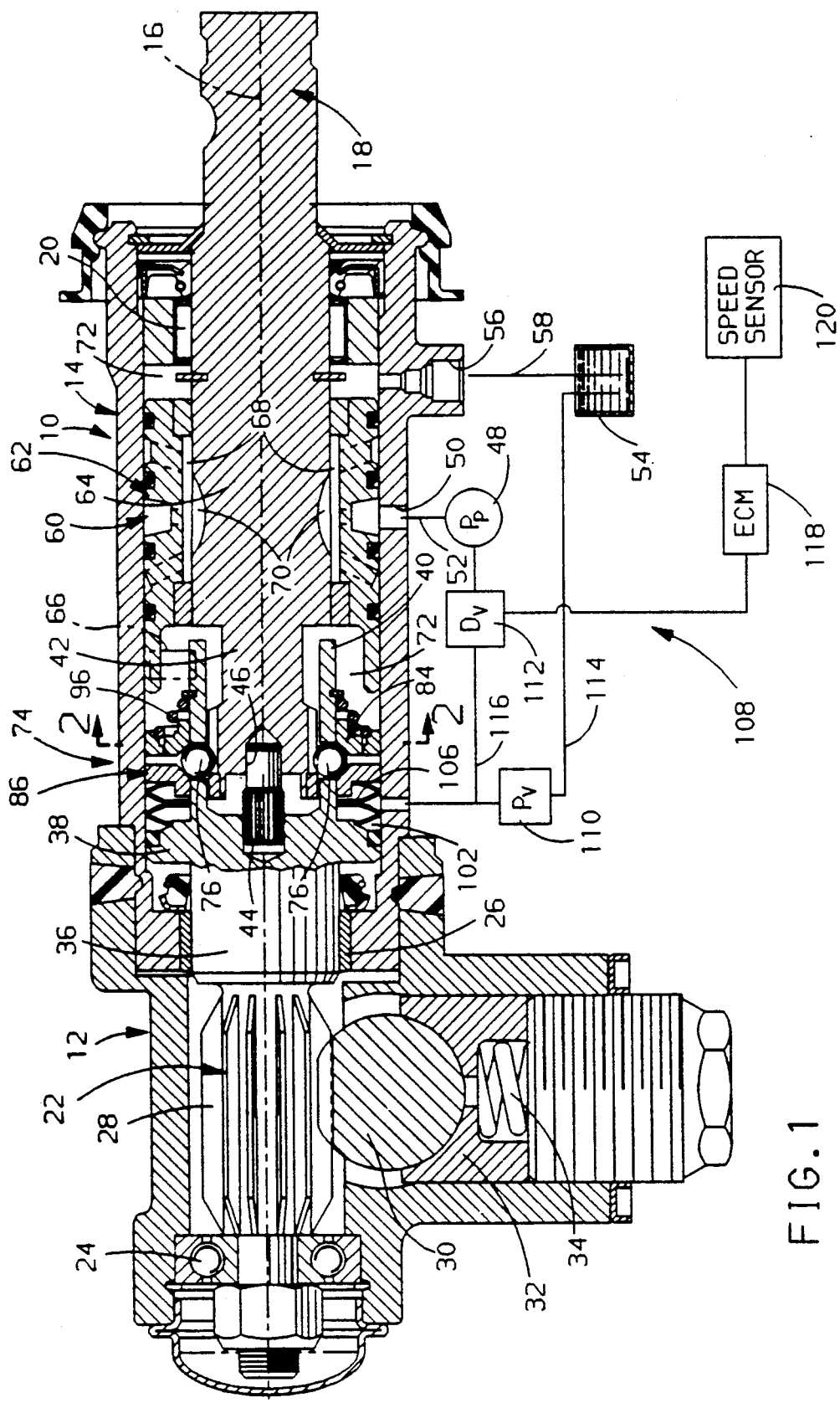
FIG. 1 is a longitudinal sectional view of an automotive hydraulic power steering gear according to this invention.
Figure 2:
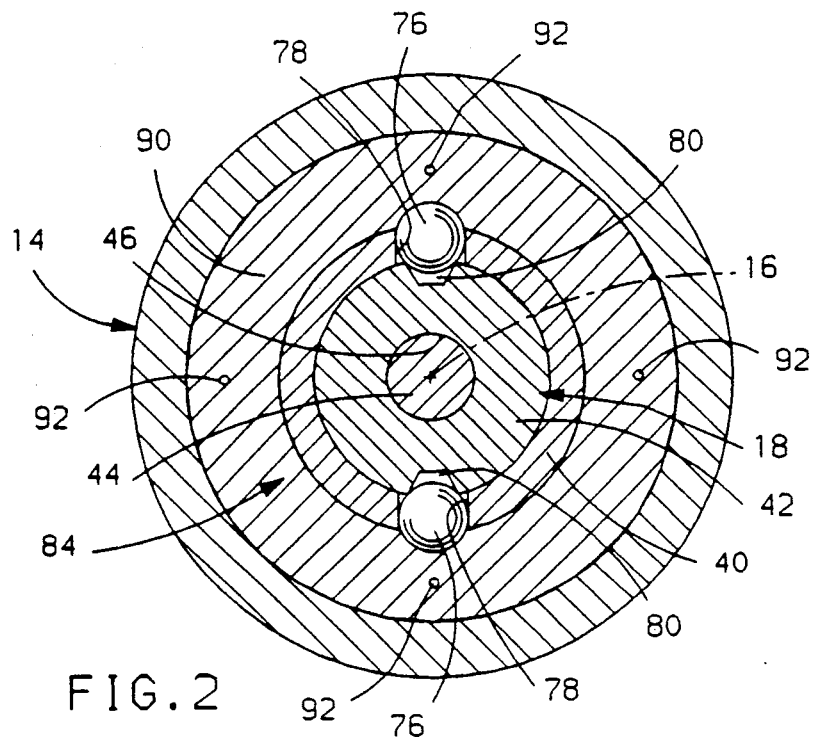
FIG. 2 is an enlarged sectional view taken generally along the plane indicated by lines 2—2 in FIG. 1.

Referring to FIGS. 1-2, a rack and pinion automotive hydraulic power steering gear (10) according to this invention includes a rack housing (12) and a cylindrical valve housing (14) rigidly attached to the rack housing and aligned on a longitudinal centerline (16) of the steering gear. A stub shaft (18) or input element of the steering gear is mounted on the valve housing (14) by a needle bearing (20) for rotation about the centerline (16). When the steering gear is installed on a vehicle, the stub shaft is connected to the steering wheel of the vehicle for unitary rotation therewith.

A pinion head (22) of the steering gear (10) is mounted on the rack housing (12) by a ball bearing (24) and a sleeve bearing (26) for rotation about the centerline (16). The pinion head (22) has a pinion gear (28) thereon meshing with rack teeth, not shown, on a steering rack (30). The steering rack is mounted on the rack housing (12) for transverse bodily shiftable movement concurrent with rotation of the pinion head (22) in the usual fashion A bearing (32) behind the steering rack (30) is urged by a spring (34) toward the rack. When the steering gear is installed on a vehicle, the steering rack is connected to the steered wheels of the vehicle through appropriate steering linkage, not shown.

The pinion head (22) has a cylindrical body (36) on the opposite side of the pinion gear (28) from the ball bearing (24), an annular flange (38) of generally the same diameter as the valve housing (14), and a tubular extension (40) on the opposite side of the flange (38) from the cylindrical body (36). The tubular extension (40) is aligned on the centerline (16) and surrounds a stem (42) of the stub shaft (18). A pilot or guide (44) is pressed into the cylindrical body (36) of the pinion head and is aligned on the centerline (16). The pilot is closely received in a bore (46) in the end of the stem (42) of the stub shaft whereby the alignment of the stub shaft and the pinion head on the centerline (16) is maintained while the pinion head and stub shaft are rotatable relative to each other about the centerline.

A schematically represented conventional power steering pump (48) is connected to a supply port (50) on the valve housing (14) by a supply conduit (52). A schematically represented reservoir (54) is connected to a return port (56) on the valve housing (14) by a return conduit (58).

The steering gear (10) further includes a conventional rotary control valve (60) as such as described in U.S. Pat. No. 4454801, issued 19 June 1984 and assigned to the assignee of this invention. The control valve (60) includes a valve sleeve (62) and a valve spool (64) defined by the portion of the stub shaft (18) inside the valve sleeve. The sleeve (62) is connected to the pinion head (22) by a radial pin (66) on the tubular extension of the latter and rotates as a unit with the pinion head.

The sleeve (62) has a plurality of internal slots (68) facing a plurality of arc-shaped grooves (70) on the outside of the spool (64). The slots (68) and grooves (70)

cooperate in known fashion in response to relative rotation between the stub shaft (18) and pinion head (22) to port fluid from the supply port (50) to one side of a steering assist fluid motor, not shown, and to port the other side of the motor to the return port (56) by way of a valve chamber (72) in the valve housing (14) down stream of the rotary control valve. In an open-center condition of the rotary valve (60) corresponding to straight ahead driving, the pump circulates fluid through the rotary valve and the valve chamber (72) in the valve housing back to the reservoir in well known fashion.

Figure 3:
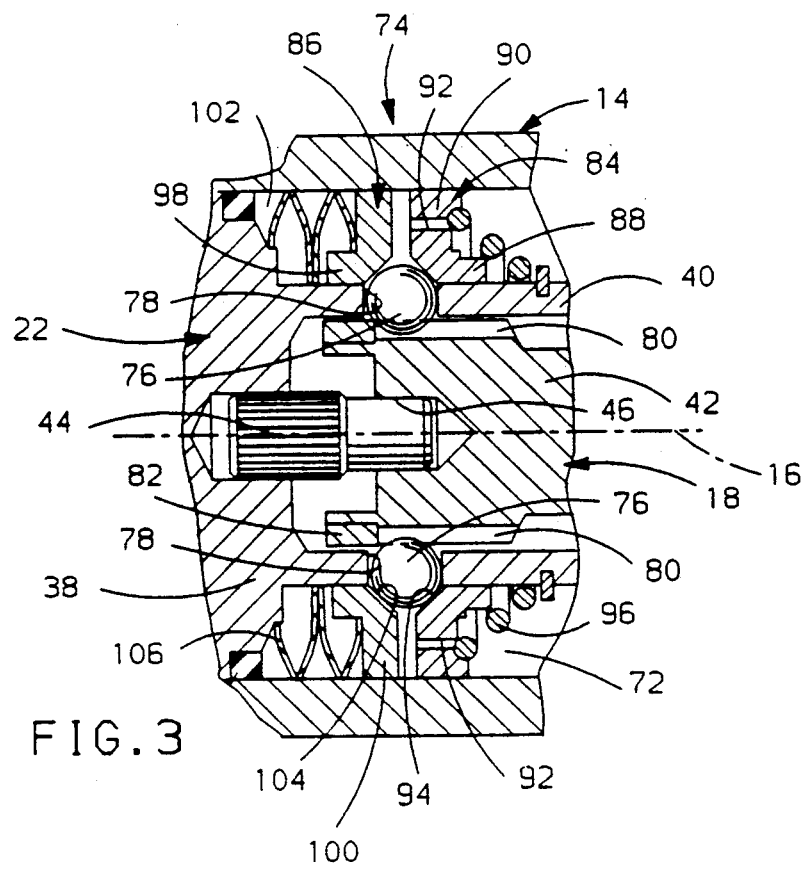
FIG. 3 is an enlarged view of a portion of FIG. 1.

A detent reaction means (74), FIG. 3, resists relative rotation between the stub shaft (18) and the pinion head (22) and includes a pair of spherical detent elements (76) in a corresponding pair of circular radial sockets (78) in the tubular extension (40) of the pinion head. The detent elements rotate with the pinion head about the centerline (16) and are radially shiftable in a plane perpendicular to the centerline.

The detent reaction means further includes a pair of longitudinal detent grooves (80) in the stem (42) of the stub shaft radially inboard of the sockets (78). The detent elements (76) seat in corresponding ones of the detent grooves and resist relative rotation between the stub shaft and the pinion head in proportion to the magnitude of radially inwardly directed detent forces on the detent elements Additional lands and grooves, not shown, may be provided on the stem (42) and the inside of the tubular extension (40) limiting relative rotation between the stub shaft and the pinion head in well known fashion A retaining ring (82), FIG. 3, is press fitted on the end of the stem to prevent dislodgment of the stem from the tubular extension (40) after the detent elements are installed in the sockets (78).

An annular low speed reaction piston (84) and an annular high speed reaction piston (86) are slidably disposed on the tubular extension (40) on opposite sides of the radial sockets (78). The low speed piston (84) has a cylindrical hub (88) defining a bearing on the tubular extension (40) and an annular flange (90) engaging the valve housing (14) at a fluid sealed, sliding interface. The annular flange (90) has a plurality of orifices (92) therethrough, FIGS. 2-3, and a beveled end face (94) engageable on the detent elements (76) when the low speed piston moves in a first direction away from the valve sleeve (62) and toward the detent elements A low speed bias spring (96) biases the low speed piston in the first direction against the detent elements The high speed reaction piston has a cylindrical hub (98) defining a bearing on the tubular extension (40) and an annular flange (100) engaging the valve housing (14) at a fluid sealed, sliding interface. An annular detent pressure chamber (102) is defined inside the valve housing (14) around the tubular extension (40) between the high speed reaction piston (86) and the annular flange (38) on the pinion head. The annular flange (100) has a beveled end face (104) engageable on the detent elements (76) when the high speed piston moves in a second direction opposite the aforesaid first direction toward the valve sleeve (62) and the detent elements. A high speed bias spring (106) in the detent pressure chamber (102) biases the high speed piston in the second direction against the detent elements.

A schematically illustrated control (108), FIG. 1, for the detent reaction means (74) includes an on/off valve (110) and a detent valve (112). The on/off valve (110) is in an exhaust conduit (114) extending directly between the detent pressure chamber (102) and the reservoir (54). The detent valve (112) is in a branch (116) between the supply conduit (52) and the exhaust conduit (114) upstream of the on/off valve. The on/off and detent valves are solenoid operated under the control of an electronic control module (118) which receives a vehicle speed signal from a speed sensor (120).

The steering gear (10) operates as follows. In a low speed range of steering gear operation corresponding to low vehicle speed or parking, the on/off valve (110) unblocks or opens the exhaust conduit (114) and the detent valve (112) blocks the branch (116). In that circumstance, the pressure in detent pressure chamber (102) is ambient. The pressure in valve chamber (72) downstream of the rotary control valve (60), however, exceeds ambient by a normal system back pressure. Also, because of the connection afforded by the orifices (92) across the low speed reaction piston, the normal system back pressure prevails in the space between the high and low speed reaction pistons (84),(86).

Since normal system back pressure exceeds ambient, a pressure gradient is established in the low speed range across the high speed reaction piston which corresponds to a net fluid pressure force on the high speed reaction piston counter to the high speed bias spring (106). Accordingly, in the low speed range the detent forces on the detent elements (76) are attributable substantially only to the bias of low speed bias spring (96). By selecting a low speed bias spring of low or moderate spring rate, steering effort comfortably low for parking is achieved As vehicle speed increases and the desirability of very easy low speed steering effort diminishes, the control module (118) reverses the orientation of the on/off and detent valves(110),(112). Accordingly, in a higher speed range of steering gear operation, the on/off valve blocks the exhaust conduit (114) and the detent valve (112) opens the branch (116) thereby to connect the detent pressure chamber (102) to the supply conduit (52). In that circumstance, with the rotary valve (60) open-center for example, system back pressure prevails on both sides of the high speed reaction piston (86) and the net pressure force in the aforesaid first direction effectively disappears.

In the absence of the net fluid pressure force on the high speed reaction piston, the high speed bias spring (106) forces beveled end face (104) of the high speed reaction piston against the detent elements Accordingly, in the higher speed range, the detent elements (76) are biased into the detent grooves (80) by the sum of the forces of the high and low speed bias springs (106),(96) as conducted to the detent elements through the high and low speed reaction pistons. More manual effort is, therefore, required to initiate power assist in the higher speed range than in the low speed range.

Still in the higher speed range, steering assist boost pressure is ducted to the detent pressure chamber (102) through the branch (116) and the open detent valve (112) when the stub shaft (18) rotates relative to the pinion head (22). As boost pressure increases, the pressure in the detent pressure chamber likewise increases so that a net pressure force on the high speed piston (86) develops in the aforesaid second direction. The detent elements (76) are thus even more forcefully urged into the detent grooves (80) so that continued rotation of the stub shaft relative to the pinion head requires more manual effort. Accordingly, in the high speed range after the onset of power assist, the relationship between power assist and manual effort is more linear.

We claim:

1. A variable effort power steering gear comprising:

an input member rotatable about a longitudinal centerline of said steering gear, an output member rotatable about said centerline relative to said input member, detent reaction means including a detent element rotatable with one of said input and said output members about said centerline and movable radially in a plane perpendicular to said centerline and a detent groove in the other of said input and said output members receiving said detent element so that relative rotation between said input and said output members is resisted by said detent element in proportion to the sum of the magnitudes of radially directed detent forces thereon urging said detent element into said detent groove, a low speed reaction piston bodily movable in a first direction and engageable on said detent element to apply a first radially directed detent force on said detent element proportional to the magnitude of a first bias force on said low speed reaction piston in said first direction, a high speed reaction piston bodily movable in a second direction opposite said first direction and engageable on said detent element to apply a second radially directed detent force on said detent element proportional to the magnitude of a second bias force on said high speed reaction piston in said second direction, and control means operative in a low speed range of said steering gear to apply only said first bias force on said low speed reaction piston in said first direction and in a high speed range of said steering gear to apply in addition to said first bias force said second bias force on said high speed reaction piston in said second direction so that the sum of the magnitudes of said radially directed detent forces on said detent element in said high speed range exceeds the sum of the magnitudes of said radially directed detent forces on said detent element in said low speed range.

2. A variable effort power steering gear comprising:

an input member rotatable about a longitudinal centerline of said steering gear, an output member rotatable about said centerline relative to said input member, detent reaction means including a spherical detent element in a radial socket in said output member rotatable as a unit with said output member about said centerline and movable radially relative to said output member in a plane perpendicular to said centerline and a detent groove in said input member receiving said detent element so that relative rotation between said input and said output members is resisted by said detent element in proportion to the sum of the magnitudes of radially directed detent forces thereon urging said detent element into said detent groove, a annular low speed reaction piston disposed on said output member on one side of said radial socket for bodily movement in a first direction and engageable on said detent element to apply a first radially directed detent force on said detent element proportional to the magnitude of a first bias force on said low speed reaction piston in said first direction, an annular high speed reaction piston disposed on said output member on the other side of said radial socket from said low speed reaction piston for bodily movement in a second direction opposite said first direction and engageable on said detent element to apply a second radially directed detent force on said detent element proportional to the magnitude of a second bias force on said high speed reaction piston in said second direction, and control means operative in a low speed range of said steering gear to apply only said first bias force on said low speed reaction piston in said first direction and in a high speed range of said steering gear to apply in addition to said first bias force said second bias force on said high speed reaction piston in said second direction so that the sum of the magnitudes of said radially directed detent forces on said detent element in said high speed range exceeds the sum of the magnitudes of said radially directed detent forces on said detent element in said low speed range.

3. The variable effort power steering gear recited in claim 2 wherein said control means includes a low speed bias spring operative to apply said first bias force on said low speed reaction piston, a high speed bias spring operative to apply said second bias force on said high speed reaction piston, and means for effecting a fluid pressure gradient across said high speed reaction piston in said low speed range of said steering gear whereby a net fluid pressure force is applied to said high speed reaction piston counter to and substantially equal to the magnitude of said second bias force.

4. A variable effort power steering gear comprising:

an input member rotatable about a longitudinal centerline of said steering gear, an output member rotatable about said centerline relative to said input member, a pump, a reservoir, a valve housing having a valve chamber, a rotary control valve in said valve housing having a valve spool rotatable as a unit with said input member about said centerline and a valve sleeve around said valve spool and rotatable as a unit with said output member about said centerline, conduit means connecting said pump and said reservoir and said valve housing such that in an open-center condition of said rotary control valve fluid circulates from said pump to said reservoir through said valve housing with an above ambient open-center back pressure prevailing in said valve chamber downstream of said rotary control valve, detent reaction means including a spherical detent element in a radial socket in said output member rotatable as a unit with said output member about said centerline and movable radially relative to said output member in a plane perpendicular to said centerline and a detent groove in said input member receiving said detent element so that relative rotation between said input and said output members is resisted by said detent element in proportion to the sum of the magnitudes of radially directed detent forces thereon urging said detent element into said detent groove, a annular low speed reaction piston disposed on said output member on one side of said radial socket for bodily movement in a first direction and engageable on said detent element to apply a first radially directed detent force on said detent element proportional to the magnitude of a first bias force on said low speed reaction piston in said first direction, a low speed bias spring operative to apply said first bias force on said low speed piston in said first direction, an annular high speed reaction piston disposed on said output member on the other side of said radial socket from said low speed reaction piston for bodily movement in a second direction opposite said first direction and engageable on said detent element to apply a second radially directed detent force on said detent element proportional to the magnitude of a second bias force on said high speed reaction piston in said second direction, means defining a detent pressure chamber on the opposite side of said high speed reaction piston from said radial socket, said high speed reaction piston defining a movable wall of said detent pressure chamber, a high speed bias spring in said detent pressure chamber operative to apply said second bias force on said high speed reaction piston in said second direction, and control means operative in a low speed range of said steering gear to effect a fluid pressure gradient across said high speed reaction piston by connecting said detent pressure chamber to ambient pressure while concurrently exposing a side of said high speed reaction piston opposite said detent pressure chamber to said open-center back pressure in said valve chamber so that a net fluid pressure force is applied to said high speed reaction piston counter to and substantially equal to the magnitude of said second bias force on said high speed piston and in a high speed range of said steering gear to remove said fluid pressure gradient by connecting said detent pressure chamber to said conduit means between said pump and said valve housing so that the sum of the magnitudes of said radially directed detent forces on said detent element in said high speed range exceeds the sum of the magnitudes of said radially directed detent forces on said detent element in said low speed range.

* * * * *